Figure 1:
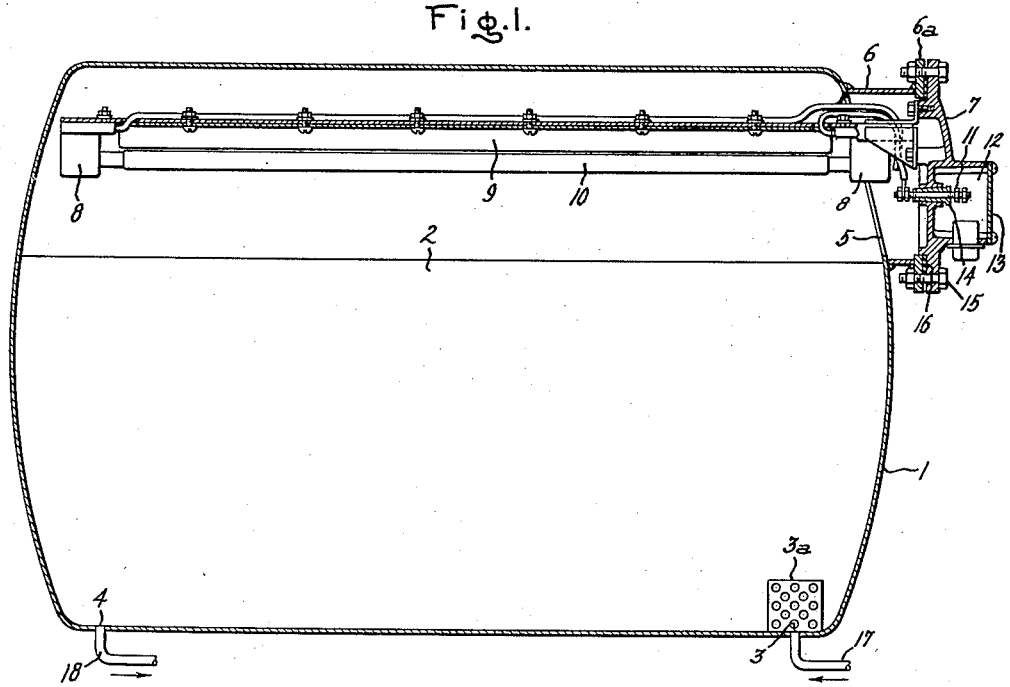

Dec. 11, 1951   J. P. FOULDS   2,578,414
LIQUID IRRADIATING APPARATUS
Filed March 28, 1950

Inventor:
John P. Foulds,
by
His Attorney.

Patented Dec. 11, 1951

2,578,414

UNITED STATES PATENT OFFICE 2,578,414

LIQUID IRRADIATING APPARATUS

John P. Foulds, Revere, Mass., assignor to General Electric Company, a corporation of New York Application March 28, 1950, Serial No. 152,470

10 Claims. (Cl. 250—43)

My invention relates to apparatus for irradiating and sterilizing liquids by means of ultraviolet rays and the like, and more particularly to water sterilizers using germicidal lamps.

In apparatus heretofore known for irradiating and sterilizing liquids with various germicidal lamps, such as ultra-violet lamps and the like, it has been found that it is generally undesirable to operate the lamp totally or partially immersed in the liquid. In the first place, contact with cold water reduces the output of an ultra-violet lamp. Also, in such apparatus the lamp envelope itself, or any glass receptacle surrounding the lamp envelope, soon becomes coated with a film in impurities contained in the liquid, thereby preventing the effective transmission of the germicidal rays and, consequently, reducing the efficiency of the apparatus. It has been found, also, that germicidal rays, and particularly ultra-violet rays, are not ordinarily effective through more than a relatively thin surface layer of liquid, unless the liquid is free of all suspended impurities, such as in distilled water. The transmission of germicidal energy through liquids varies greatly depending upon the nature of the liquid, but in general, wherever even minute traces of suspended impurities are present, the absorption of energy is so great that the effective transmission distance is relatively small. For example, the distance for 90% energy absorption may be a few thousandths of an inch for milk, and up to a few inches through ordinary drinkable water.

Water, and particularly water utilized domestically, is thus particularly well adapted for sterilization by germicidal ray energy because it is a relatively clear liquid. There is also a definite need for reliable but inexpensive water sterilizing apparatus for domestic use in private homes and among small commercial users. This is particularly true in respect to homes having private water supply systems, such as farms, suburban homes and the like.

Accordingly, it is the general object of my invention to provide a new and improved liquid irradiating apparatus which is effective and reliable in operation, while simple and inexpensive in construction.

It is a further object of my invention to provide a new and improved liquid irradiating apparatus wherein the source of germicidal rays, such as an ultra-violet lamp, or the like, operates in air.

It is still another object of my invention to provide a new and improved liquid irradiating apparatus wherein all the liquid passing through the apparatus is forced at some time during its passage to traverse a section of very shallow depth, while at the same time being exposed to a concentration of germicidal rays.

Figure 2:
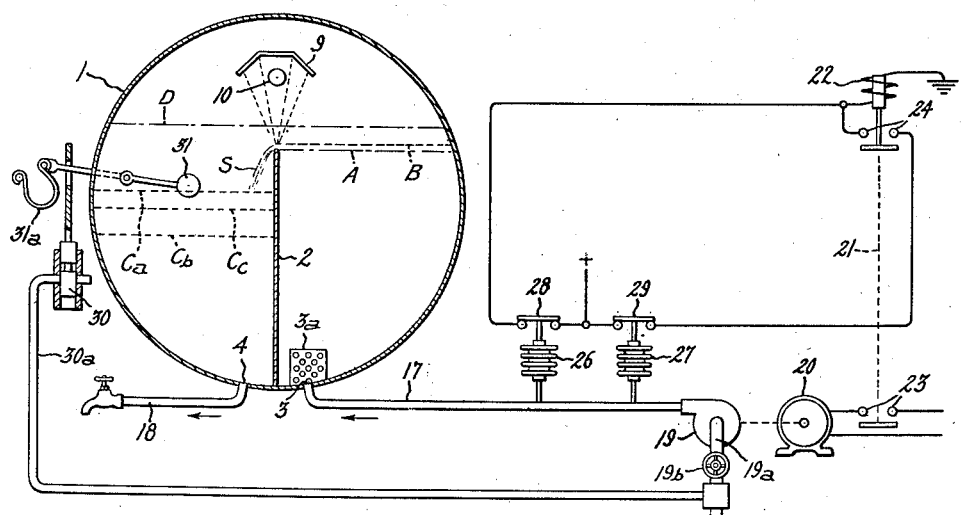
Figure 3:
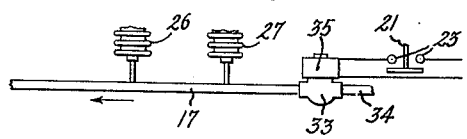

My invention, itself, will be more fully understood and its various objects and advantages further appreciated by referring now to the following detailed specification taken in conjunction with the accompanying drawing, in which Fig. 1 is a cross-sectional view of a liquid irradiating apparatus embodying my invention; Fig. 2 is a schematic diagram of such an apparatus including the liquid supply means and automatic control therefor; and Fig. 3 is a fragmentary schematic diagram illustrating another embodiment of the invention.

In the drawing I have shown a preferred embodiment of my invention by way of illustration. The apparatus includes a treating chamber 1, such as a metal tank or the like, capable of withstanding internal pressures appreciably above atmospheric pressure, such as, for example, the pressure commonly utilized in a domestic water supply system. The tank 1 may suitably be an elongated cylindrical tank of the type utilized as a pressure or a storage tank in a domestic water system. The tank is provided internally with a partial dividing wall or partition 2 the upper edge of which is appreciably below the top of the tank. Inlet and outlet openings, 3 and 4 respectively (Fig. 2), are provided on the lower side of the tank at opposite ends and on opposite sides of the partition 2, so that the partition serves as a dam over which all liquid to be treated must pass in a thin sheet in the course of its passage through the tank. Preferably the inlet opening is provided with a diffuser, such as a perforate diffusing cup 3a, thereby to diffuse entering water with the water already in the tank in such a manner that the minimum time of passage of any water through the tank approaches the average time. In this way the effective exposure time is made as large as possible.

In one end of the tank 1 and above the upper edge of dam 2 there is provided a lamp receiving opening 5 to the periphery of which is secured, as by welding, a protruding tubular housing 6 having a flange 6a to which is secured a header 7. Mounted internally upon the header 7 I provide a lamp supporting structure including lamp sockets 8 and an elongated reflector 9. The sockets 8 are positioned at opposite ends of the reflector 9, and adapted to support between them an elongated ultra-violet discharge lamp 10 positioned in substantially parallel spaced relation above the upper edge of the dam 2. The reflector is so positioned above the lamp 10 that reflected ray energy is concentrated along the upper edge of the dam, as illustrated at Fig. 2.

The header 7 is also provided with terminal conductors for the lamp, such as a binding post 11, extending through the header from the interior to the exterior thereof and terminating in a terminal box 12 having an external cover 13. The terminal post 11 extends through a pressure-tight bushing 14 and the header 7 is fixed in place by a plurality of bolts 15 and provided with a pressure-tight gasket 16 between the header and the flange 6a on the tank.

Referring now to Fig. 2, I have shown a simplified transverse cross-sectional view of the liquid treating receptacle illustrated as Fig. 1, along with a liquid inlet conduit 17, a liquid outlet conduit 18, and suitable liquid supply and control means. The apparatus shown at Fig. 2 is particularly adapted for connection to a private water supply system and includes a water pump 19 driven by an electric motor 20. The pump 19 is supplied with liquid through a conduit 19a which is provided with a check valve 19b. In such a system the liquid treating tank 1 may serve also as the pressure tank commonly forming part of the system, there being a quantity of air under supply pressure entrapped in the tank above the water.

The electric motor 20 is adapted to be connected to a suitable source of electric current supply through an electromagnetic switch or contactor 21 having an actuating winding 22, a normally open main or motor contact 23 and a normally open holding contact 24. The liquid inlet conduit 17 is connected to the outlet side of the water pump 19 and is provided with a pair of pressure-responsive switches 26 and 27 having normally closed contacts 28 and 29 respectively. The switch 27 is adjusted to open its contact 29 at a predetermined maximum desired pressure within tank 1, and the switch 26 is adjusted to close its contact 28 at a predetermined desired minimum pressure within the tank 1. Thus, if the pressure within the tank is at the predetermined maximum value, both pressure switch contacts 28 and 29 are open.

The contactor actuating winding 22 is connected to be energized from a suitable source of electric current supply through the minimum pressure switch contact 28. A holding circuit is provided for the contactor through the maximum pressure switch contact 29 and the normally open holding contact 24 of the contactor 21.

There is a tendency for a pressure tank such as that described, to become waterlogged. This is usually due to absorption of the entrapped air into the water flowing from the tank. In order to counteract such a tendency and to maintain a substantially fixed quantity of air within the tank, it is desirable to provide on the inlet side of the pump 19 an air inlet controlled by liquid level. For this purpose I provide an air inlet valve 30 connected by a conduit 30a to the inlet side of the pump 19. The valve 30 is actuated by a float 31 in the tank 1, and has an appreciable differential between opening and closing operation. By way of example I have shown a hairpin spring 31a between the float lever and a fixed base, thereby to provide an overcenter snap action and a differential in the action of the valve 30.

In operation, it will be understood that a substantially fixed quantity of air is entrapped within the tank 1 above the water. Water entering the tank first fills up the tank on the inlet side of the dam 2 to a level A (Fig. 2) at the top of the dam. As further water is supplied to the tank, the water rises to a slightly higher level B and flows over the upper edge of the dam 2 in a thin sheet S. This sheet of water, as it flows over the upper edge of the dam, is subjected to concentrated ultra-violet ray energy emanating from the lamp 10 both directly and by reflection from the reflector 9. The reflected energy particularly is concentrated along the upper edge of the dam 2 where the water depth is a minimum. Water flowing over the dam fills up the outlet side of the tank to any predetermined level, such as Ca, at which the pressure within the tank resulting from compression of the entrapped air in the upper portion of the tank attains the predetermined maximum value at which the switch contacts 29 are opened. The maximum pressure and the volume of entrapped air are such that the normal maximum water level Ca on the outlet side of the dam is no higher than the level B. Preferably the normal maximum water level Ca on the outlet side of the dam is below the upper edge of the dam.

If now water is withdrawn from the tank 1 through the outlet conduit 18, the water level on the outlet side of the dam 2 falls until it reaches a predetermined normal minimum level Cb appreciably below the upper edge of the dam 2. At this level the air pressure within the tank attains a predetermined minimum value at which the pressure switch contact 28 closes. When the contact 28 is closed an energizing circuit is completed for the motor contactor 21 and the motor 20 is thereby energized to set in operation the pump 19 and supply water to the inlet side of the dam 2. When the contactor 21 picks up it completes the holding circuit previously traced through the holding contact 24 and the maximum pressure switch 29, so that as liquid is supplied to the tank and the pressure within the tank raised, opening of the minimum pressure switch contact 28 does not interrupt the motor circuit. When the liquid level on the outlet side of the dam 2 reaches the predetermined normal maixmum level Ca at which the pressure within the tank is sufficient to actuate the maximum pressure switch 27, the switch contact 29 is opened, thereby to interrupt the holding circuit for the contactor 21 and de-energize the motor 20. The pump 19 is thus stopped, and no further liquid is supplied to the tank.

It will be understood that the foregoing operation can also be carried out in response to a single pressure switch which has an appreciable pressure differential between "on" and "off" positions.

In order to prevent water-logging of the treating tank 1 by gradual absorption of the entrapped air into water passing through the tank, the float 31 is arranged to open the air valve 30 each time the water on the outlet side of the dam reaches the level Ca. Air is thus admitted to the inlet side of the pump 19, so that, unless the tank pressure is already up to the normal maximum value, the pump 19 pumps air into the tank until the pressure reaches such value. The pump is then shut off by the pressure switch 27, but the tank pressure is maintained by the check valve 19b despite the fact that the air valve 30 remains open. When water is drawn from the system in use, the water level on the outlet side of the dam 2 falls. When this water reaches the level Cc the air valve 30 is closed. When the water level is further drawn down to Cb the pump is started by means of the pressure switch 26, as previously described. The air valve is not again opened until water on the outlet side of the dam 2 reaches Ca.

It will be undertsood by those skilled in the art that air replacement may be accomplished by other available means, such as diaphragm type injectors, or any source of air under pressure.

At Fig. 3 I have shown a partial schematic diagram of suitable control apparatus for connection of the irradiating tank 1 to a city pressure supply system, as through an inlet valve 33 and a supply pipe 34. In the embodiment of the invention illustrated at Fig. 3, the water pump 19 of Fig. 2 is replaced by a solenoid-actuated inlet valve 33, the pump motor 20 is replaced by a valve actuating solenoid 35, and the air injecting apparatus is omitted. In all other respects the embodiment illustrated at Fig. 3 is the same as that illustrated at Fig. 2, and the various control elements are to be similarly connected and have been assigned like reference numerals. Air injection in the system of Fig. 3 may suitably be provided by level control of a separate air pump.

The operation of the embodiment of the invention illustrated at Fig. 3 will be clear from the foregoing description of the operation of the apparatus at Fig. 2, it being understood that the solenoid valve 33 is opened to admit water from the supply pipe 34 into the tank whenever the valve solenoid 35 is energized by picking up the contactor 21.

While I have shown and described certain preferred embodiments of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. In an apparatus for irradiating liquids with germicidal rays, a pressure-tight container having an apertured wall, a substantially vertical partial internal partition within said container, said partition being disposed substantially perpendicular to said wall and constituting a liquid confining dam, a closure member for said apertured wall, and means mounted upon said closure member for supporting within said container and in substantially parallel spaced relation above the upper edge of said dam an elongated source of germicidal rays, said source of rays and said mounting means being adapted for passage through said apertured wall.

2. In an apparatus for irradiating liquids with ultra-violet rays, an elongated pressure-tight tank having an apertured end wall, a substantially vertical partial internal partition longitudinally disposed within said tank and constituting a liquid confining dam, a closure member for said apertured end wall, means mounted upon said closure member for supporting wholly within said tank and in substantially parallel spaced relation above the upper edge of said dam an elongated ultra-violet lamp and an elongated reflector therefor, said reflector and mounting means being adapted for passage through said apertured end wall with said lamp in position, lamp terminal conductors passing through said closure member, and a terminal box mounted upon the outer side of said closure member and enclosing the external portions of said terminal conductors.

3. In an apparatus for irradiating liquids with germicidal rays, a pressure-tight container having a substantially vertical partial internal partition constituting a dam, liquid inlet and liquid outlet means on opposite sides of said dam, means for mounting in substantially parallel spaced relation with and above the upper edge of said dam an elongated source of germicidal rays, means for reflecting upwardly directed rays and concentrating said reflected rays along said upper edge, and means for normally maintaining the liquid level within said container on the outlet side of said dam substantially at or below said upper edge.

4. In an apparatus for irradiating liquids with germicidal rays, a pressure-tight container having a partial internal partition constituting a dam, liquid inlet and liquid outlet means on opposite sides of said dam, means for mounting an elongated source of germicidal rays within said container above the upper edge of said dam and in substantially parallel spaced relation therewith, means for supplying liquid under pressure to the inlet side of said dam, and means for controlling said supply means normally to maintain the liquid level on the outlet side of said dam substantially at or below said upper edge.

5. In an apparatus for irradiating liquids with germicidal rays, a pressure-tight container having a partial internal partition constituting a dam, liquid inlet and liqud outlet means on opposite sides of said dam, means for mounting an elongated source of ultra-violet rays within said container above the upper edge of said dam and in substantially parallel spaced relation therewith, means for supplying liquid under pressure to said container, said container being adapted when connected for operation to said supply means normally to contain a substantially fixed quantity of entrapped air, and maximum and minimum pressure responsive means for controlling said supply means normally to maintain the liquid on the outlet side of said dam between maximum and minimum levels, said minimum level being appreciably below said upper edge.

6. In an apparatus for irradiating liquids with ultra-violet rays, a pressure-tight container having a partial internal partition constituting a dam, liquid inlet and liquid outlet means on opposite sides of said dam, means for mounting an elongated ultra-violet lamp wholly within said container above the upper edge of said dam and in substantially parallel spaced relation therewith, an elongated reflector mounted above said lamp and arranged to concentrate rays reflected from said lamp along said upper edge, means for supplying liquid under pressure to the inlet side of said dam, said container being adapted when connected for operation to said supply means normally to contain a substantially fixed quantity of entrapped air, and maximum and minimum pressure responsive means connected to control said supply means to maintain the liquid level on the outlet side of said dam continuously substantially at or below the level of said upper edge.

7. In an apparatus for irradiating liquids with germicidal rays, a pressure-tight container having a partial internal partition constituting a dam, liquid inlet and liquid outlet means on opposite sides of said dam, means for mounting an elongated source of germicidal rays above the upper edge of said dam in substantially parallel spaced relation therewith, means for supplying liquid under pressure to said container, said container being adapted when connected to said supply means normally to contain a substantially fixed quantity of entrapped air, and pressure responsive means connected to control said supply means to maintain the average level of liquid on the outlet side of said dam at a position below said upper edge.

8. In an apparatus for irradiating liquids with germicidal rays, a pressure-tight container having a partial internal partition constituting a liquid confining dam, liquid inlet and liquid outlet means on opposite sides of said dam, means for supplying liquid under pressure to said container, said container being adapted when connected to said supply means normally to contain a substantially fixed quantity of entrapped air, pressure responsive means connected to control said supply means to maintain the average liquid level on the outlet side of said dam at a position below the upper edge thereof, means for supporting wholly within said container and in substantially parallel spaced relation above said upper edge an elongated source of germicidal rays, and a reflector positioned above said source to concentrate reflected rays along said upper edge.

9. In an apparatus for irradiating liquids with germicidal rays, a pressure-tight container having a partial internal partition constituting a liquid confining dam, liquid inlet and liquid outlet means on opposite sides of said dam, means for supplying liquid under pressure to said container, liquid level responsive means for normally maintaining within said container a substantially fixed quantity of entrapped air, pressure responsive means connected to control said supply means to maintain the average liquid level on the outlet side of said dam at a position below the upper edge thereof, and means for supporting wholly within said container and in substantially parallel spaced relation above said upper edge an elongated source of germicidal rays.

10. In an apparatus for irradiating liquids with ultra-violet rays, an elongated pressure-tight tank having a partial internal partition disposed substantially vertically and longitudinally therein and constituting a liquid confining dam, liquid inlet and liquid outlet means on opposite sides of said dam, means for supplying liquid under pressure to the inlet side of said dam, liquid level responsive means for normally maintaining within said container a substantially fixed quantity of entrapped air, first control means responsive to a predetermined minimum pressure within said tank for setting said supply means in operation, second control means responsive to a predetermined maximum pressure within said tank for disabling said supply means, means for mounting an elongated ultra-violet lamp wholly within said container above the upper edge of said dam and in substantially parallel spaced relation therewith, and an elongated reflector mounted above said lamp and arranged to concentrate rays reflected from said lamp along the upper edge of said dam.

JOHN P. FOULDS.

REFERENCES CITED

The following references are of record in the file of this patent:

UNITED STATES PATENTS

| Number | Name | Date |
| --- | --- | --- |
| 1,266,803 | Henri et al. | May 21, 1918 |
| 2,298,124 | Hartman | Oct. 6, 1942 |